United States Patent [19]

Larson et al.

[11] Patent Number: 5,548,712
[45] Date of Patent: Aug. 20, 1996

[54] DATA STORAGE SYSTEM AND METHOD FOR MANAGING ASYNCHRONOUS ATTACHMENT AND DETACHMENT OF STORAGE DISKS

[75] Inventors: Susan L. Larson, Kuna; Douglas L. Voigt, Boise; Steven D. Messinger, Boise; Michael B. Jacobson, Boise, all of Id.

[73] Assignee: Hewlett-Packard Company, Palo Alto, Calif.

[21] Appl. No.: 376,179

[22] Filed: Jan. 19, 1995

[51] Int. Cl.$^6$ .......................... G01R 31/28; G06F 11/00
[52] U.S. Cl. ........................ 395/182.05; 371/10.2
[58] Field of Search .................. 395/182.05, 182.06, 395/441, 182.01, 182.03; 371/10.2

[56] References Cited

U.S. PATENT DOCUMENTS

| | | | |
|---|---|---|---|
| 4,989,206 | 1/1991 | Dunphy | 395/182.05 |
| 5,088,081 | 2/1992 | Farr | 395/182.05 X |
| 5,155,835 | 10/1992 | Belsan | 395/425 |
| 5,179,704 | 1/1993 | Jibbe | 395/725 |
| 5,195,100 | 3/1993 | Katz et al. | 371/66 |
| 5,218,689 | 6/1993 | Hotle | 395/425 |
| 5,237,658 | 8/1993 | Walker et al. | 395/200 |
| 5,278,838 | 1/1994 | Ng et al. | 371/10.1 |
| 5,287,462 | 2/1994 | Jibbe et al. | 395/275 |
| 5,289,418 | 2/1994 | Youngerth | 365/201 |
| 5,297,258 | 3/1994 | Hale et al. | 395/275 |
| 5,369,758 | 11/1994 | Larson | 395/182.05 |
| 5,371,743 | 12/1994 | DeYesso | 371/8.1 |
| 5,390,187 | 2/1995 | Stallmo | 371/10.1 |
| 5,390,327 | 2/1995 | Lubbers | 395/182.05 |
| 5,392,244 | 2/1995 | Jacobson | 365/200 |

*Primary Examiner*—Robert W. Beausoliel, Jr.
*Assistant Examiner*—Glenn Snyder

[57] ABSTRACT

A disk array data storage system has plural sets of storage disks connected to multiple corresponding I/O buses. Individual storage disks can be independently and asynchronously attached to or detached from corresponding interfacing slots of the I/O buses. The system has physical device drivers which represent the storage disks with respect to their connections to the interfacing slots of the I/O buses and physical device managers which represent the data kept on the storage disks. Interface drivers are provided to manage I/O transfers through corresponding I/O buses. When a particular storage disk is attached to or detached from an interfacing slot of an I/O bus, the interface driver corresponding to the I/O bus freezes all I/O requests that come from the physical device drivers that represent the storage disks in the set connected to the I/O bus. A configuration manager determines which interfacing slot the particular storage disk has been attached to or detached from. If the particular storage disk has been detached from the I/O bus, the configuration manager eliminates the physical device driver that represents the detached storage disk. The data stored on the detached storage disk is rebuilt using redundancy on the remaining disks. If the particular storage disk has been attached to the I/O bus, the configuration manager creates a new physical device driver to represent the attached storage disk. The I/O requests to the I/O bus are then unfrozen.

13 Claims, 5 Drawing Sheets

DATA STORAGE SYSTEM AND METHOD FOR MANAGING ASYNCHRONOUS ATTACHMENT AND DETACHMENT OF STORAGE DISKS

FIELD OF THE INVENTION

This invention relates to disk array data storage systems, and more particularly, to systems and methods for managing asynchronous attachment and detachment of independent storage disks.

BACKGROUND OF THE INVENTION

Disk array data storage systems have multiple storage disk drive devices which are arranged and coordinated to form a single mass storage system. The disk array has multiple mechanical bays or interfacing slots which receive individual storage disks. The memory capacity of such a storage system can be expanded by adding more disks to the system, or by exchanging existing disks for larger capacity disks.

Some conventional disk array data storage systems permit a user to connect or "hot plug" additional storage disks to available interfacing slots while the system is in operation. Although the "hot plug" feature is convenient from a user standpoint, it presents some difficult control problems for the data storage system. One problem that arises during "hot plug" occurs when a user attempts to switch storage disks among the various interfacing slots. For instance, a user might remove the disk that was in one interfacing slot and plug it into another interfacing slot. When this occurs, the conventional disk array system writes data to the incorrect storage disk. The prior art solution to this problem has been to simply place a limitation on the user not to shuffle the storage disks among interfacing slots. Thus, once a storage disk is assigned to a slot, it remains there.

Another problem concerns the processing of I/O requests during removal of a storage disk from the disk array. When the storage disk is decoupled from the interfacing slot, conventional storage systems typically return a "timeout" warning, indicating that the I/O request has failed. This warning is usually generated when the storage system can not access an existing storage disk due to mechanical or other storage problems. Here, in contrast, the reason for the failed access is that the storage disk is missing. A more appropriate interpretation, then, is to report that the storage disk has been removed, not that the I/O request has failed. It would be helpful if a disk array could distinguish between a missing storage disk and a failed I/O request to an existing storage disk.

Another problem facing large disk array data storage systems having many independent storage disks concerns the effect that attachment or detachment of a storage disk has on the rest of the storage disks coupled to the system. In present disk arrays, attachment or removal of a storage disk causes a temporary halt of all I/O activity to all storage disks on the disk array. It would be advantageous to construct a disk array that identifies the storage disk that has been attached or removed and to isolate I/O activity involving that storage disk from other I/O's, thus enabling the remaining storage disks to continue activity.

SUMMARY OF THE INVENTION

A disk array data storage system according to an aspect of this invention has multiple sets of plural storage disks connected to multiple corresponding I/O buses. Individual storage disks can be independently and asynchronously attached to or detached from corresponding interfacing slots of the I/O buses. The system has physical device drivers which represent the storage disks with respect to their connections to the interfacing slots of the I/O buses. The system further includes physical device managers which represent the data kept on the storage disks.

Interface drivers are provided to manage I/O transfers through corresponding I/O buses. When a particular storage disk is attached to or detached from an interfacing slot of an I/O bus, the I/O bus is reset. This stops activity on the I/O bus and prevents on-going activity from completing. The interface driver corresponding to the I/O bus freezes all I/O requests to the physical device drivers that represent the storage disks in the set connected to the I/O bus.

A configuration manager is provided to determine which interfacing slot the particular storage disk has been attached to or detached from. If a storage disk has been detached from the I/O bus, the configuration manager eliminates the physical device driver that represents the detached storage disk. The missing data stored on the detached storage disk is then rebuilt on the remaining disks using redundant data. Thereafter, the physical device manager for the detached disk can be eliminated.

If a new storage disk has been attached to the I/O bus, the configuration manager creates a new physical device driver to represent the attached storage disk with respect to its connection to the interfacing slot. A new physical device manager may also be created to represent the data on the new storage disk.

The configuration manager reverifies all storage disks connected to the I/O bus and then signals the interface driver causing it to flush the I/O requests to the physical device drivers for appropriate action. By initially freezing the queues of I/O requests to the I/O bus and then reverifying all storage disks attached to the I/O bus, including the newly attached disk, the system effectively prohibits user commands from accessing the wrong storage disks. Additionally, the system quickly identifies and isolates the newly attached/detached storage disk so that the I/O activity to the remaining storage disks on the disk array can continue.

According to other aspects of this invention, methods for asynchronously attaching and detaching a storage disk to and from a disk array data storage system are provided.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
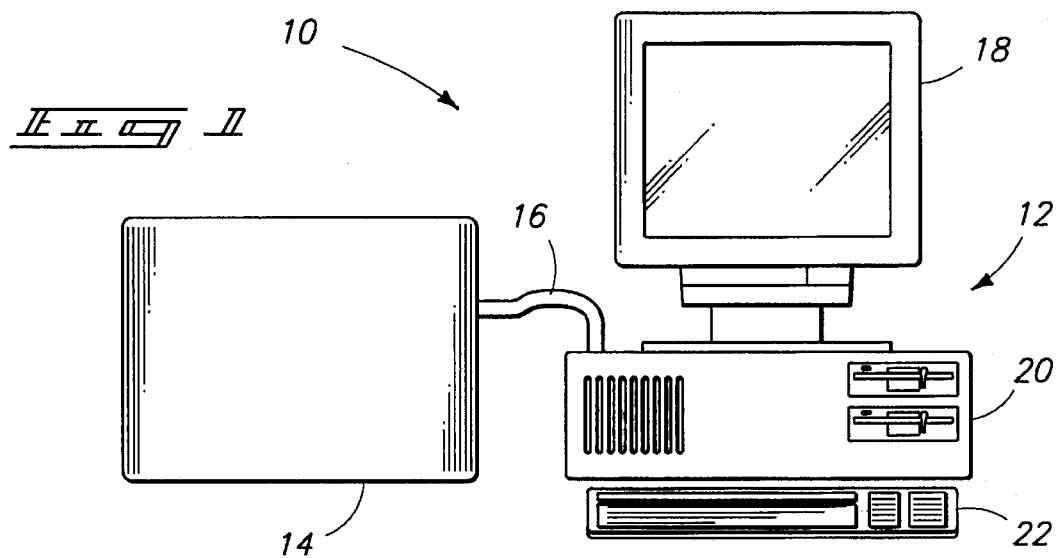
FIG. 1 is a diagrammatical illustration of a host computer station connected to a disk array data storage system of this invention.

FIG. 1 shows a computer system 10 having a host computer terminal or station 12 connected to a data storage system 14 via host interface bus 16. Host computer station 12 includes a visual display monitor 18, a central processing unit (CPU) 20, and a keyboard 22.

Figure 2:
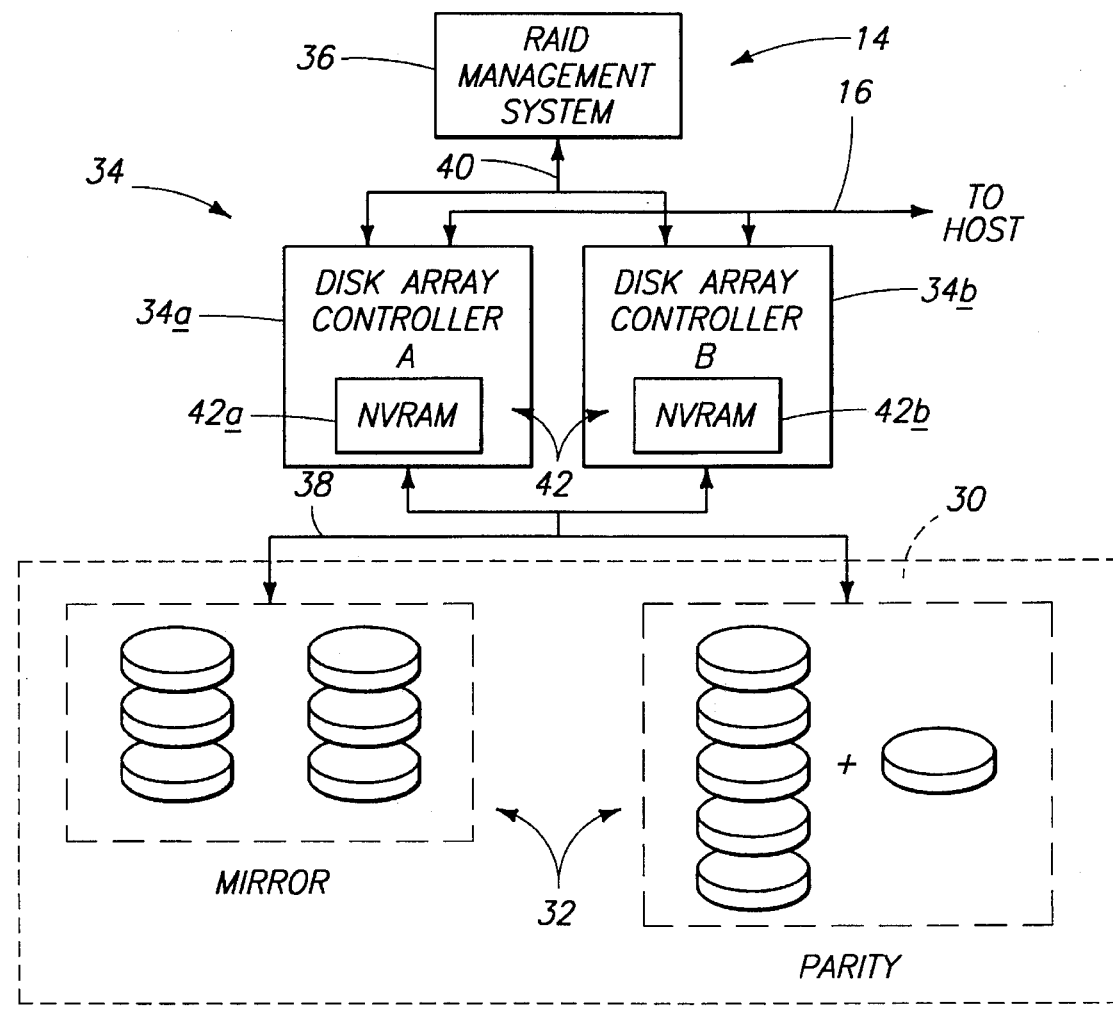
FIG. 2 is a block diagram of a data storage system embodied as a hierarchical disk array.

FIG. 2 shows an example construction of data storage system 14 embodied as a redundant hierarchic disk array data storage system. Disk array storage system 14 includes a disk array 30 having a plurality of storage disks 32, a disk array controller 34 coupled to the disk array 30 to coordinate data transfer to and from the storage disks 32, and a RAID management system 36.

In this example construction, disk array controller 34 is implemented as a dual controller consisting of disk array controller A 34a and disk array controller B 34b. Dual controllers 34a and 34b enhance reliability by providing continuous backup and redundancy in the event that one controller becomes inoperable. The disk array controller 34 is coupled to the host computer via host interface bus 16.

RAID management system 36 is operatively coupled to disk array controller 34 via an interface protocol 40. The term "RAID" (Redundant Array of Independent Disks) means a disk array in which part of the physical storage capacity is used to store redundant information about user data stored on the remainder of the storage capacity. The redundant information enables regeneration of user data in the event that one of the array's member disks or the access path to it fails. A more detailed discussion of RAID systems is found in a book entitled, *The RAIDBook: A Source Book for RAID Technology*, published Jun. 9, 1993, by the RAID Advisory Board, Lino Lakes, Minn.

RAID management system 36 can be embodied as a separate component, or configured within disk array controller 34 or within the host computer to provide a data manager means for controlling disk storage and reliability levels, and for transferring data among various reliability storage levels. These reliability storage levels are preferably mirror or parity redundancy levels, but can also include a reliability storage level with no redundancy at all.

Redundant hierarchic disk array 30 can be characterizable as different storage spaces, including its physical storage space and one or more virtual storage spaces. These various views of storage are related through mapping techniques. For example, the physical storage space of the disk array can be mapped into a RAID-level virtual storage space which delineates storage areas according to the various data reliability levels. For instance, some areas within the RAID-level virtual storage space can be allocated for a first reliability storage level, such as mirror or RAID level 1, and other areas can be allocated for a second reliability storage level, such as parity or RAID level 5. The RAID level virtual view can be mapped to a second application-level virtual storage space which presents a contiguously addressable storage space. The physical configuration and RAID view of the storage space are hidden from the application view, which is presented to the user.

A memory map store 42 provides for persistent storage of the virtual mapping information used to map different storage spaces into one another. The memory mapping information can be continually or periodically updated by the controller or RAID management system as the various mapping configurations among the different views change. In this configuration, memory map store 42 is embodied as two non-volatile RAMs (Random Access Memory) 42a and 42b, such as battery-backed RAMs, which are located in respective controllers 34a and 34b. The dual NVRAMs 42a and 42b provide for redundant storage of the memory mapping information.

Figure 3:
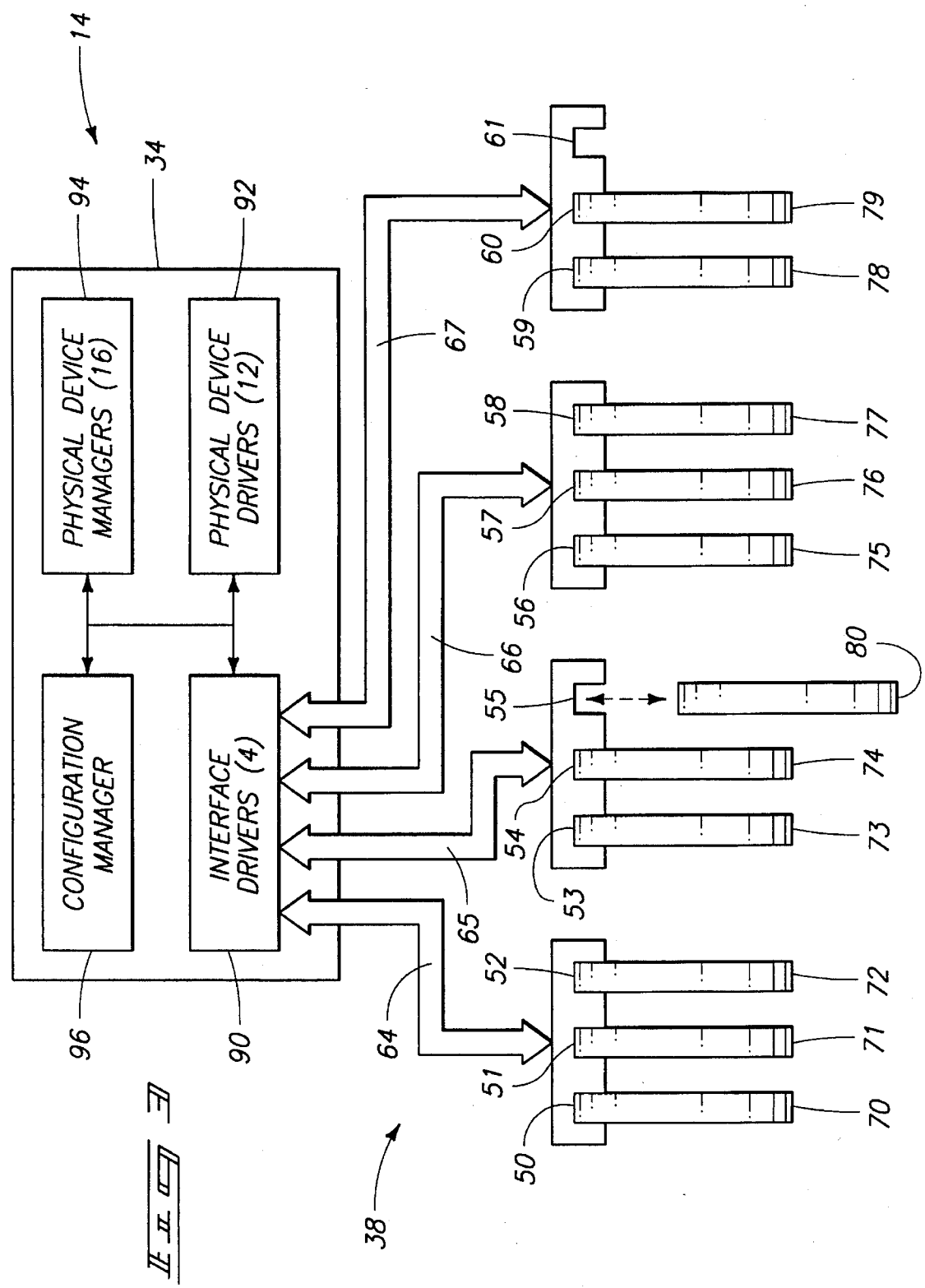
FIG. 3 is a block diagram illustrating the interfacing and management of independent storage disks.

FIG. 3 shows a preferred architecture of disk array data storage system 14. Disk array controller 34 is coupled to the disk array via multiple internal I/O buses, referenced generally by numeral 38. Preferably, each I/O bus is a small computer system interface (SCSI) type bus. Each I/O bus is operably connected to a set of storage disks. In this example construction, the disk array data storage system can accommodate twelve storage disks and thus has twelve active mechanical bays or interfacing slots 50–61. Four SCSI I/O buses 64–67 are coupled to respective sets of three interfacing slots. That is, I/O bus 64 is coupled to interfacing slots 50–52; I/O bus 65 is coupled to interfacing slots 53–55; I/O bus 66 is coupled to interfacing slots 56–58; and I/O bus 67 is coupled to interfacing slots 59–61.

The storage disks are independently detachably connected to I/O buses 64–67 at interfacing slots 50–61. Each storage disk can be asynchronously attached to or detached from the interfacing slots. The disk array data storage system is shown as having ten existing storage disks 70–79 that are detachably connected to interfacing slots 50–54 and 56–60, respectively. Once interfacing slot 61 is open and available to receive a storage disk. Storage disk 80 is shown as being attached to or detached from interfacing slot 55. The storage disks have example sizes of one to three Gigabytes. If all slots are filled, the data storage system has an example combined capacity of 12–36 Gigabytes.

Interface drivers 90 are provided to manage I/O transfers through I/O buses 64–67. There are preferably four interface drivers, one for each bus. The interface drivers 90 are implemented in firmware resident in disk array controller 34.

The disk array data storage system of this invention includes multiple physical device drivers 92 and multiple physical device managers 94. There are preferably twelve physical device drivers, one for each storage disk that can be connected to the disk array. The physical device drivers 92 are implemented as objects in firmware to represent the storage disks with respect to their connections to the interfacing slots of the I/O buses. For example, one physical device driver represents whatever disk is connected to interfacing slot 52 of I/O bus 64, which in this case, is storage disk 72.

The physical device managers 94 are implemented as objects in firmware to represent data kept on the individual storage disks. There are preferably sixteen physical device managers, one for each storage disk, plus an extra four to temporarily represent data on any disks which have recently been removed from the system. The physical device managers are associated with corresponding physical device drivers that represent the same storage disks. During a normal read/write request from the host, the request is passed through the physical device manager 94, to the physical device driver 92, to the interface driver 90, and to the appropriate I/O bus and storage disk.

A configuration manager 96 is also provided to manage operation of the disk array data storage system in the event a storage disk is attached to or detached from an I/O bus. The configuration manager is implemented as an object in firmware to schedule events that control the conduct of the physical device managers and physical device drivers that represent the newly attached/detached storage disk.

For purposes of continuing discussion, suppose that storage disk 80 in FIG. 3 is being attached to or detached from interfacing slot 55. The action of attaching or detaching a storage disk causes generation of a reset condition according to conventional electro-mechanical techniques. The interfacing electro-mechanics of the storage disk and slot involve connector pins of different lengths (typically 2–3 different lengths). During attachment, the longer pins make initial contact, followed by the shorter pins, until the drive is connected. A reset condition is generated and placed on I/O bus 65 after the longer pins are inserted. The reset condition on the I/O bus goes away after the shorter pins are inserted to complete connection. The reset condition induced by the mechanical multi-tier insertion scheme is sensed in the disk array controller and causes an interrupt within the controller. Reset halts the I/Os in progress on the affected bus.

The reverse process is used for detachment. The shorter pins are first disconnected, followed by the longer pins. This mechanical event causes a reset condition indicative of disk removal.

Figure 4:
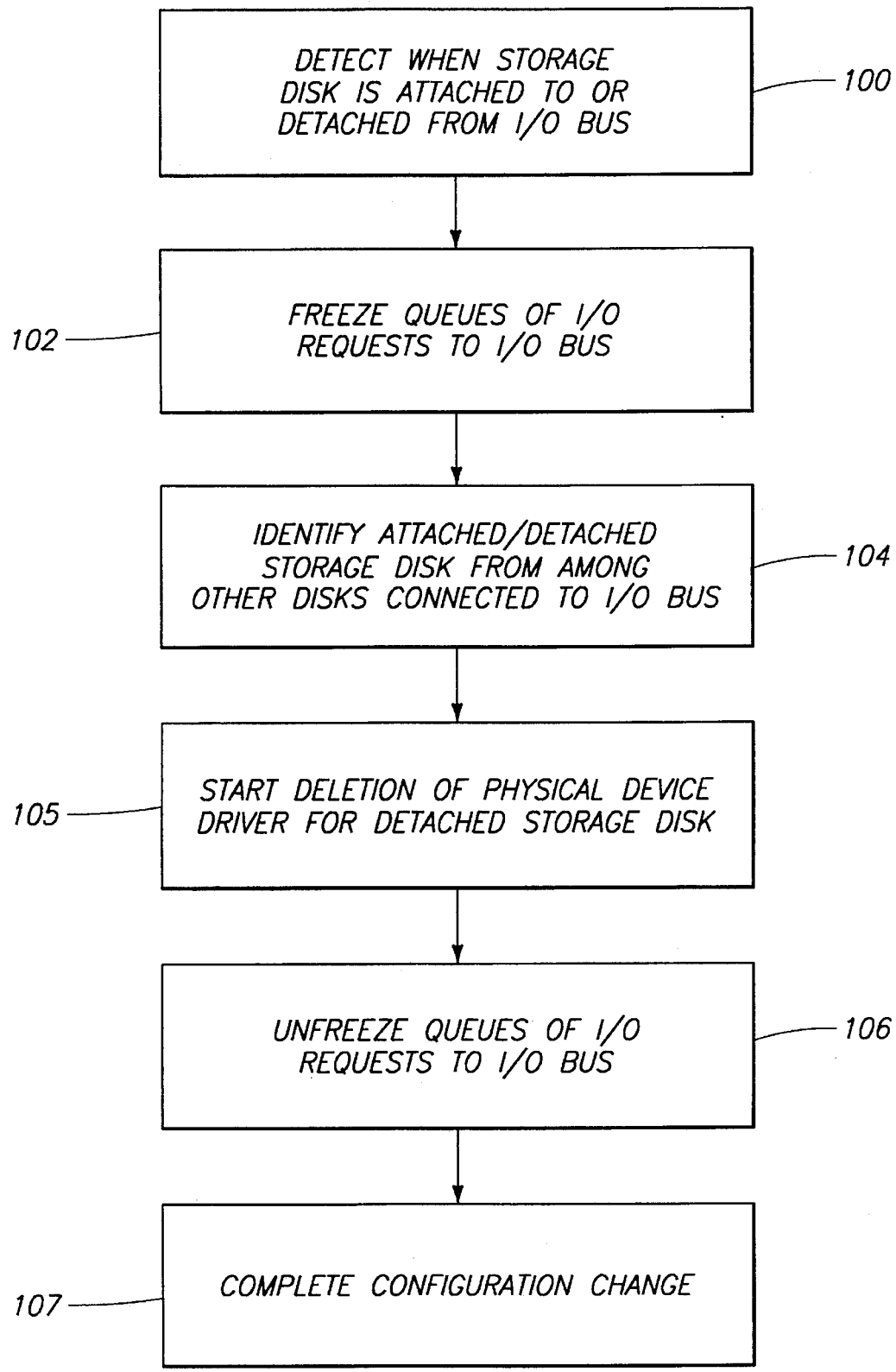
FIG. 4 is a flow diagram of general steps for asynchronously attaching and detaching a storage disk according to an aspect of this invention.

FIG. 4 shows a general method for asynchronously attaching and detaching a storage disk to and from a disk array data storage system according to this invention. At step 100, storage disk 80 is detected as being attached to or detached from the interfacing slot 55 on I/O bus 65. Upon detection, the queues of I/O requests to I/O bus 65 are frozen (step 102). It is noted that the I/O requests to the other three I/O buses 64, 66, and 67 continue to be processed.

At step 104, the disk array controller distinguishes the newly attached/detached storage disk 80 from the other storage disks 73 and 74 that are connected to the same I/O bus 65. Once the specific disk and interfacing slot are identified, if storage disk 80 has been detached, the configuration manager starts the deletion of the physical device driver for that disk (step 105). Then, the queues of I/O requests to the other storage disks 73 and 74 are unfrozen to permit their continued use (step 106). In this manner, the method of this invention effectively identifies and isolates the activity of only the single storage disk that has been attached or detached. Access to the other disks continues with minimal interruption. After the queues are unfrozen, if storage disk 80 has been attached, the configuration manager creates a physical device driver for that disk and requests that the physical device driver make the disk ready for use. When storage disk 80 is ready for use, the configuration manager associates the physical device driver with a physical device manager.

The methods for asynchronous attachment and detachment of storage disks will now be described separately below, but in more detail, with reference to FIGS. 3, 5 and 6.

Method for Asynchronous Attachment

Figure 5:
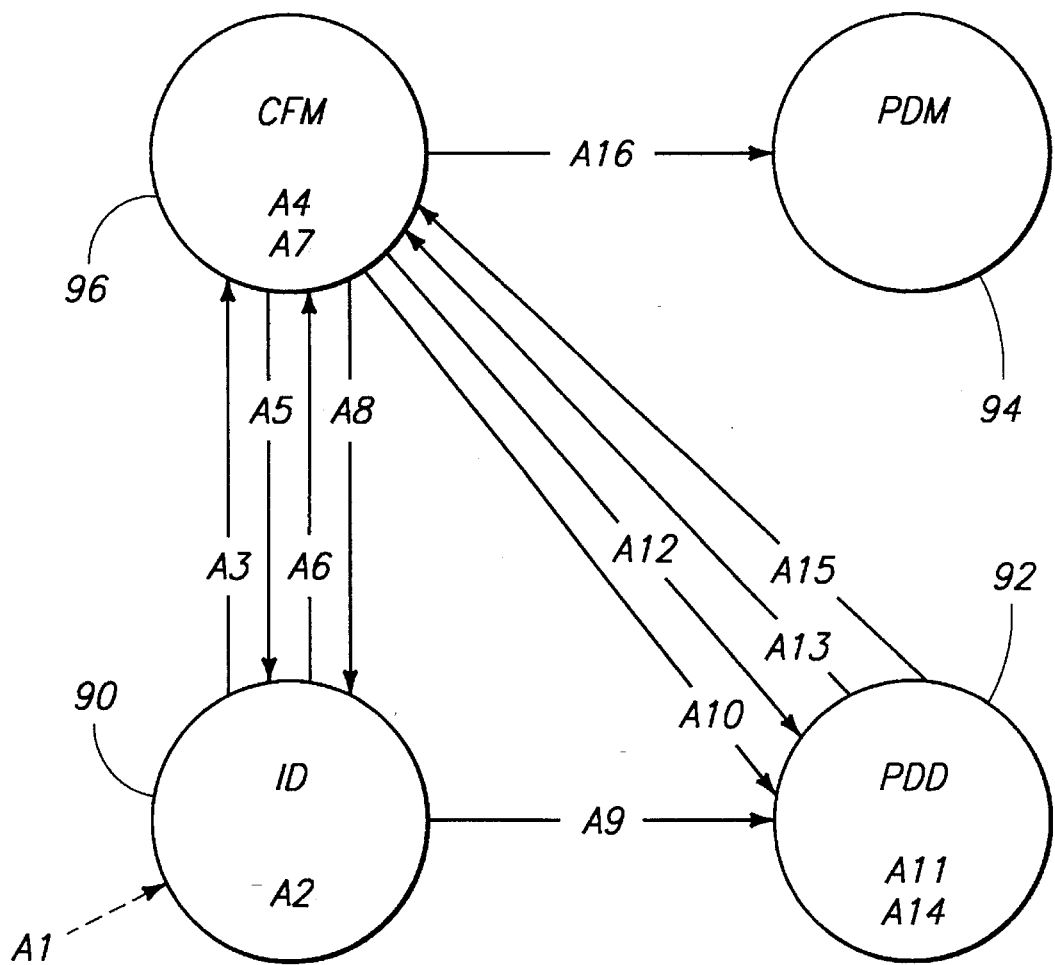
FIG. 5 is a process flow diagram illustrating preferred control steps for asynchronously attaching a storage disk to a disk array.

FIG. 5 illustrates preferred steps for a method for asynchronously attaching a storage disk to a disk array data storage system. For this discussion, assume that storage disk 80 is being attached to slot 55 of I/O bus 65. FIG. 5 shows an interface driver (ID) 90 for I/O bus 65, a physical device driver (PDD) 92 that represents storage disk 80 with respect to its connection to slot 55, a physical device manager (PDM) 94 that represents the data kept on storage disk 80, and a configuration manager (CFM) 96. The process is labelled alphanumerically as steps A1–A16, with the letter "A" designating the attachment process. A shorthand description for each step is provided in the depicted table.

At step A1, a reset condition is generated by the electro-mechanical interface structure upon insertion of storage disk 80 into interfacing slot 55. The reset condition is sent over I/O bus 65 to the interface driver (ID). The I/O bus 65 is thus immediately identified as being the bus to which a new storage disk is attached, and not the other three buses 64, 66, and 67. At step A2, the interface driver (ID) freezes all queues of I/O requests to I/O bus 65. The interface driver continues to receive I/O requests, but does not process them. I/Os in progress and I/Os that arrive are frozen in the interface o driver (ID) queues. The physical device driver (PDD) maintains its own queues which are not frozen. It can still receive I/Os from the configuration manager (CFM) and the physical device manager (PDM) and forward I/O requests to the interface driver (ID). The interface driver (ID), however, will not forward the I/O requests to the storage disks.

At step A3, the interface driver (ID) notifies the configuration manager (CFM) that a reset condition has been detected in I/O bus 65. The configuration manager (CFM) examines all three interface slots 53–55 supported by I/O bus 65 to distinguish the new storage disk 80 from the other existing storage disks 73 and 74. The identification process includes scanning for each storage disk attached to I/O bus 65 (step A4) by repeatedly requesting and receiving identification information via the interface driver (ID) from each storage disk (steps A5 and A6). After all three interface connections have been scanned, the configuration manager can make specific identification of the newly attached storage disk 80 (step A7).

At step A8, the configuration manager (CFM) notifies the interface driver (ID) to unfreeze the queues of I/O requests to the other storage disks 73 and 74 on I/O bus 65. The interface driver (ID) informs the physical device driver (PDD) of this queue flush condition with hot reset status (step A9). The hot reset status is simultaneously sent by the interface driver to other physical device drivers (not shown) that represent attached storage disks 73 and 74, causing the disks to be reconfigured. After this point, control communication flow is carried on primarily between the configuration manager (CFM) and the physical device driver (PDD).

At step A10, the configuration manager (CFM) creates a new physical device driver (PDD) to represent the newly attached storage disk 80 at interfacing slot 55 on I/O bus 65. The new physical device driver (PDD) is initialized with the channel or I/O bus number, and the interfacing slot number (step A11). The configuration manager (CFM) then instructs the physical device driver (PDD) to "spin up" or begin operation of the new storage disk 80 (step A12). The physical device driver (PDD) returns the unique vendor serial number of storage disk 80 to the configuration manager (CFM) (step A13) and commences spin up of the new storage disk (step A14). Once the storage disk 80 is determined to be ready, it is configured for correct operation in the disk array.

It is noted that simultaneous to steps A10–A14 for the newly added storage disk 80, the configuration manager (CFM) is preferably reverifying the identity and location of the other two storage disks 73 and 74 that are also connected to I/O bus 65. When the physical device drivers (not shown) for the storage disks 73 and 74 receive the hot reset status or SCSI unit attention, they automatically reconfigure these storage disks. As part of the configuration, the physical device driver (PDD) retrieves the serial number from the storage disk and reports it to the configuration manager (CFM). In this manner, the configuration manager (CFM) essentially revalidates the serial numbers of all three storage disks on the I/O bus to detect any new changes resulting from the attachment of the new storage disk, such as removal and insertion of a storage disk into the same slot.

At step A15, the physical device driver (PDD) informs the configuration manager (CFM) that the spin up and configuration of newly attached storage disk 80 is complete. At that point, the configuration manager can create a new physical device manager (PDM) which represents the data on newly attached storage disk 80 (step A16). This step entails initializing the variables of the physical device manager (PDM) to uniquely represent the particular storage disk 80.

Alternatively, the configuration manager (CFM) might associate the physical device driver (PDD) with an existing physical device manager (PDM). This is the situation, for example, when the new storage disk 80 had been previously attached to the system in another interfacing slot and a physical device manager (PDM) which represents the data content on that disk already exists. Recall that the data storage system can have sixteen physical device managers (PDM) for a potential twelve storage disks. The extra four physical device managers (PDM) can continue to represent data on the four most recently detached storage disks.

Once a physical device manager (PDM) is assigned to storage disk 80, the space on storage disk 80 is now made available to the user. If the newly inserted disk is deemed inoperable or ineligible for normal access, a placeholder physical device manager (PDM) is created to present the disk to the host for diagnosis.

It is noted that the system and method according to this invention effectively solves the prior art problem of writing data to a wrong storage disk that is discussed above in the Background of the Invention section. The system and method of this invention call for immediately freezing the queues of I/O requests to the I/O bus that generated the reset condition. Thereafter, the storage disks attached to the I/O bus, including the newly attached bus, are reverified to double check which storage disks are attached to the I/O bus before the I/O requests are processed. As a result, it is impossible for the user commands to reach the wrong storage disks.

Method for Asynchronous Detachment

Figure 6:
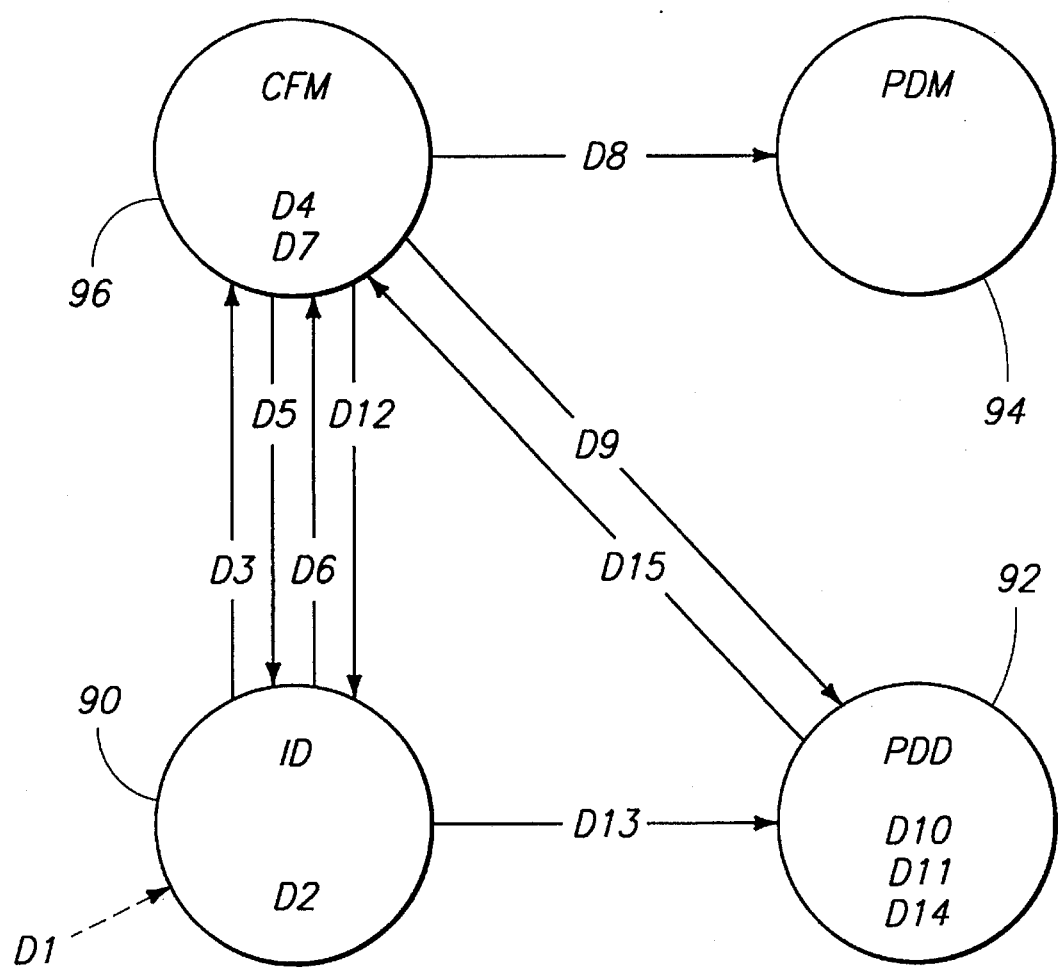
FIG. 6 is a process flow diagram illustrating preferred control steps for asynchronously detaching a storage disk from a disk array.

FIG. 6 illustrates preferred steps for a method for asynchronously detaching a storage disk from a disk array data storage system according to an aspect of this invention. For this discussion, assume that storage disk 80 is being removed from slot 55 of I/O bus 65. FIG. 6 shows the interface driver (ID) 90 for I/O bus 65, the physical device driver (PDD) 92 that represents storage disk 80 with respect to its connection to slot 55, the physical device manager (PDM) 94 that represents the data kept on storage disk 80, and the configuration manager (CFM) 96. The process is labelled alphanumerically as steps D1–D15, with the letter "D" designating the detachment process. A shorthand description for each step is provided in the depicted table.

Steps D1–D7 are essentially the same as steps A1–A7 described above. Briefly, at step D1, a reset condition is generated by the electro-mechanical interface structure, upon removal of storage disk 80 from interfacing slot 55, and sent over I/O bus 65 to the interface driver (ID). At step D2, the interface driver (ID) freezes all queues of I/O requests to I/O bus 65. At step D3, the interface driver (ID) notifies the configuration manager (CFM) that a reset condition has been detected in I/O bus 65. The configuration manager (CFM) examines all three interface slots 53–55 supported by I/O bus 65 to identify the detached storage disk 80 from among the other existing storage disks 73 and 74 (steps D4–D7).

At step DS, the configuration manager (CFM) notifies the physical device manager (PDM) that its represented storage disk 80 has been detached from the disk array. The physical device manager (PDM) is instructed to stop submitting I/O requests to its associated physical device driver (PDD) which represents the same detached storage disk. At step D9, the configuration manager (CFM) initiates a process to eliminate the physical device driver (PDD) that represents the detached storage disk 80. The physical device driver (PDD) places itself in a delete-in-progress state and awaits the flushing of any final I/O requests from the interface driver (steps D10 and D11 ).

At step D12, the configuration manager (CFM) notifies the interface driver (ID) to unfreeze the queues of I/O requests to the storage disks on I/O bus 65. The interface driver (ID) informs the physical device driver (PDD) of this queue flush condition (step D13). After the active queue is emptied, the physical device driver (PDD) notifies the configuration manager (CFM) that the deletion is complete (steps D14 and D15).

All unanswered I/O requests are returned to the associated physical device manager (PDM) which already knows that the storage disk is missing. The data is reconstructed using the RAID management system in order to complete the I/O request. For redundant disk arrays, such as the example RAID system described above in FIG. 2, the missing data on the removed storage disk 80 can be rebuilt on other storage disks using the redundant data. The physical device manager (PDM) for the detached storage disk remains viable until the rebuild process is finished in order to track deallocation of data from the missing drive.

Although the processes of this invention have been described separately, multiple attachments and/or detachments can occur at the same time involving one or more buses. The same procedures described above apply in these situations as well.

It is noted that the system and method according to this invention provides the user with an accurate description of why an I/O request may not be immediately processed. When a storage disk is removed, the physical device driver (PDD) for the storage disk is deleted (step D9 and D10) and the I/O requests are flushed (step D13). The system therefore returns a warning to the user indicating that a storage disk is missing, but continues to process I/O requests using redundant data as described above. Therefore, unlike prior art systems, the system of this invention does not return a misleading "timeout" notice indicating that the request is denied due to a faulty drive or other I/O problem.

Another advantage of this invention is that the attached/detached storage disk is quickly identified and isolated so that the I/O activity to the remaining storage disks on the disk array can continue. This is an improvement over prior art systems that temporarily halt all I/O activity to all storage disks on the disk array.

The combined use of associated physical device drivers and physical device managers provide further benefits of this invention. A user is now free to move disks from one interfacing slot to another without limitation. Upon withdrawal of a storage disk from the first slot, the physical device driver representing the storage disk in the first slot is deleted. The physical device manager for the storage disk remains. When the disk is reinserted into the second slot, a new physical device driver representing the storage disk in the second slot is created. The new physical device driver is then associated with the physical device manager for the same disk, and all is ready for normal operation.

The system and methods of this invention therefore provide tremendous flexibility to the user. The user can add or replace disk drives or rearrange their connection to the disk array without affecting data content and reliability. Additionally, all of the data remains accessible during the "hot plug" process.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for asynchronously attaching and detaching a storage disk to and from a disk array data storage system, the disk array data storage system comprising multiple storage disks connected to at least one internal I/O bus, the method comprising the following steps:

detecting when a particular storage disk is attached to or detached from an I/O bus in a disk array data storage system, the disk array data storage system having other storage disks connected to the I/O bus, the storage disks having associate serial numbers;

freezing queues of I/O requests to the I/O bus that said particular storage disk is attached to or detached from;

distinguishing said particular storage disk from the other storage disks connected to the I/O bus;

unfreezing the queues of I/O requests to the other storage disks on the I/O bus; and reverifying identity and location storage disks connected to the I/O bus by reconfiguring all storage disks connected to the I/O bus and revalidating the serial numbers of the storage disk connected to the I/O bus.

2. A method according to claim 1 wherein the disk array data storage system has multiple I/O buses, individual I/O buses being capable of connecting with multiple storage disks, the method further comprising the following additional steps:

identifying the I/O bus which said particular storage disk has been attached to or detached from; and distinguishing said particular storage disk from the other storage disks connected to the same identified I/O bus.

3. A method for asynchronously attaching a storage disk to a disk array data storage system, the disk array data storage system comprising a disk array controller, plural storage disks, and multiple internal I/O buses, individual ones of the internal I/O buses being capable of interconnecting and transferring I/O requests between the disk array controller and multiple storage disks, the method comprising the following steps:

providing physical device drivers within the disk array controller which represent the storage disks with respect to their connections to the I/O buses;

detecting when a new storage disk is attached to one of the I/O buses in the disk array data storage system;

freezing queues of I/O requests to said one I/O bus to which the new storage disk is attached;

distinguishing the new storage disk from any other storage disks connected to said one I/O bus;

unfreezing the queues of I/O requests to the other storage disks connected to said one I/O bus;

reverifying identity and location of all storage disks connected to said one I/O bus, including the new storage disk; and creating a new physical device driver for the new storage disk.

4. A method according to claim 3 further comprising the following additional steps:

providing physical device managers within the disk array controller which represent data kept on the storage disks; and associating the new physical device driver with an existing physical device manager.

5. A method according to claim 3 further comprising the following additional steps:

providing physical device managers within the disk array controller which represent data kept on the storage disks;

creating a new physical device manager for the new storage disk; and associating the new physical device driver with the new physical device manager.

6. A method according to claim 3 wherein the storage disks have associated serial numbers, the reverifying step comprising the following additional steps:

reconfiguring all storage disks connected to said one I/O bus; and revalidating the serial numbers of the storage disks connected to said one I/O bus.

7. A method for asynchronously detaching a storage disk from a disk array data storage system, the disk array data storage system comprising a disk array controller, plural storage disks, and multiple internal I/O buses, individual ones of the internal I/O buses being capable of interconnecting and transferring I/O requests between the disk array controller and multiple storage disks, the method comprising the following steps:

providing physical device drivers within the disk array controller which represent the storage disks with respect to their connections to the I/O buses;

providing physical device managers within the disk array controller which represent data kept on the storage disks, the physical device managers being associated with corresponding physical device drivers that represent the same storage disks;

detecting when an existing storage disk is detached from one of the I/O buses in the disk array data storage system;

freezing queues of I/O requests to said one I/O bus from which the existing storage disk is detached;

distinguishing the detached storage disk from any other storage disks connected to said one I/O bus;

informing the physical device manager that represents the detached storage disk that the detached storage disk is disconnected from said one I/O bus;

eliminating within the disk array controller the physical device driver that represents the detached storage disk; and unfreezing the queues of I/O requests to said one I/O bus.

8. A method according to claim 7 further comprising the following additional steps:

storing data redundantly on the storage disks; and rebuilding missing data on the detached storage disk onto the storage disks in the disk array data storage system using the redundant data stored on the storage disks.

9. A method according to claim 8 further comprising the following additional steps:

completing any I/O requests for the missing data on the detached storage disk using one of the redundant data or the rebuilt data.

10. A disk array data storage system comprising:

a plurality of storage disks;

multiple I/O buses, individual ones of the internal I/O buses being connected to a set of storage disks;

the storage disks being detachably connected to the I/O buses at interfacing slots whereby individual storage disks can be asynchronously attached to or detached from corresponding interfacing slots of the I/O buses;

a plurality of physical device drivers for corresponding storage disks, the physical device drivers representing the storage disks with respect to their connections to the interfacing slots of the I/O buses;

a plurality of physical device managers for corresponding storage disks, the physical device managers representing data kept on the storage disks, the physical device managers being associated with corresponding physical device drivers that represent the same storage disks;

interface drivers to manage I/O transfers through corresponding I/O buses;

when a particular storage disk is attached to or detached from an interfacing slot of one of the I/O buses, the interface driver corresponding to said one I/O bus freezing I/O requests that came from the physical device drivers that represent the storage disks in the set connected to said one I/O bus;

a configuration manager to manage operation of the disk array data storage system when said particular storage disk is attached to or detached from said one I/O bus, the configuration manager first determining which interfacing slot the particular storage disk has been attached to or detached from and then subsequently instructing the interface driver to unfreeze the I/O requests and flush the I/O requests back to the physical device drivers associated with the other storage disks in the set of storage disks connected to said one I/O bus.

11. A disk array data storage system according to claim 10 wherein, upon removal of said particular storage disk from said one I/O bus, the configuration manager eliminates the physical device driver that represents said particular storage disk.

12. A disk array data storage system according to claim 10 wherein, upon attachment of said particular storage disk to said one I/O bus, the configuration manager creates a new physical device driver to represent said particular storage disk with respect to its connection to the interfacing slot of said one I/O bus.

13. A disk array data storage system according to claim 10 wherein, upon attachment of said particular storage disk to said one I/O bus, the configuration manager creates a new physical device manager to represent data kept on said particular storage disk.

* * * * *